(12) United States Patent
Redaelli

(10) Patent No.: US 11,780,168 B2
(45) Date of Patent: Oct. 10, 2023

(54) METHOD FOR THE TREATMENT OF CAKE RESULTING FROM ADDITIVE MANUFACTURING PROCESSES

(71) Applicant: Paolo Redaelli, Biassono (IT)

(72) Inventor: Paolo Redaelli, Biassono (IT)

( * ) Notice: Subject to any disclaimer, the term of this patent is extended or adjusted under 35 U.S.C. 154(b) by 0 days.

(21) Appl. No.: 17/754,350

(22) PCT Filed: Jun. 18, 2021

(86) PCT No.: PCT/IB2021/055398
§ 371 (c)(1),
(2) Date: Mar. 30, 2022

(87) PCT Pub. No.: WO2022/013646
PCT Pub. Date: Jan. 20, 2022

(65) Prior Publication Data
US 2022/0371283 A1 Nov. 24, 2022

(30) Foreign Application Priority Data
Jul. 16, 2020 (IT) .................... 102020000017350

(51) Int. Cl.
*B33Y 40/20* (2020.01)
*B29C 64/35* (2017.01)
(Continued)

(52) U.S. Cl.
CPC ............... *B29C 64/35* (2017.08); *B07B 1/40* (2013.01); *B08B 5/02* (2013.01); *B08B 7/02* (2013.01);
(Continued)

(58) Field of Classification Search
CPC ......... B29C 64/35; B29C 64/357; B07B 1/40; B07B 2230/04; B08B 5/02; B08B 7/02;
(Continued)

(56) References Cited

U.S. PATENT DOCUMENTS

2015/0266211 A1    9/2015   Wolfgang et al.

FOREIGN PATENT DOCUMENTS

DE    102017002448 A1    11/2017
EP         1361022 A2 *  11/2003    ............. B08B 3/044
(Continued)

OTHER PUBLICATIONS

Machine translation of EP3718692A1 (Year: 2020).*
(Continued)

*Primary Examiner* — Erin F Bergner
(74) *Attorney, Agent, or Firm* — LUCAS & MERCANTI, LLP

(57) ABSTRACT

A machine and a method for treating cakes from additive manufacturing processes, wherein the cake contains residual powders and sintered pieces is disclosed. The machine includes a cylindrical vibrating body which is placed in a position above a vibratory finishing or tumbling or vibro-blasting machine and is separated from the vibratory finishing or tumbling or vibro-blasting machine by a remotely operable door and the cylindrical vibrating body obtains its vibration from the machine below. The machine includes means for destructuring the cake in order to obtain the separation of the non-sintered powder from the sintered pieces present in the cake and means for recovering the powder resulting from the destructuring of the cake.

8 Claims, 3 Drawing Sheets

(51) Int. Cl.
  *B29C 64/357* (2017.01)
  *B07B 1/40* (2006.01)
  *B08B 5/02* (2006.01)
  *B08B 7/02* (2006.01)
  *B08B 7/04* (2006.01)
  *B08B 13/00* (2006.01)
  *B29K 77/00* (2006.01)

(52) U.S. Cl.
  CPC ............... *B08B 7/04* (2013.01); *B08B 13/00* (2013.01); *B29C 64/357* (2017.08); *B33Y 40/20* (2020.01); *B07B 2230/04* (2013.01); *B08B 2220/04* (2013.01); *B29K 2077/00* (2013.01)

(58) Field of Classification Search
  CPC ....... B08B 7/04; B08B 13/00; B08B 2220/04; B33Y 40/20; B29K 2077/00; Y02P 10/25; Y02W 30/52; Y02W 30/62; B22F 10/28; B22F 10/68; B29B 2017/0203; B29B 2017/0224; B29B 2017/0227; B29B 17/02; B29B 17/0005
  See application file for complete search history.

(56) References Cited

FOREIGN PATENT DOCUMENTS

| | | | | |
|---|---|---|---|---|
| EP | 2436486 A1 | * | 4/2012 | ........... B24B 31/062 |
| EP | 3718692 A1 | * | 10/2020 | ............... B24C 3/00 |
| WO | 2019138180 A1 | | 7/2019 | |

OTHER PUBLICATIONS

Italian Search Report for Corresponding Italian Application No. IT 202000017350, 2 pages, dated Mar. 22, 2021.

International Search Report and Written Opinion for Corresponding International Application No. PCT/IB2021/055398, 11 pages, dated Sep. 14, 2021.

* cited by examiner

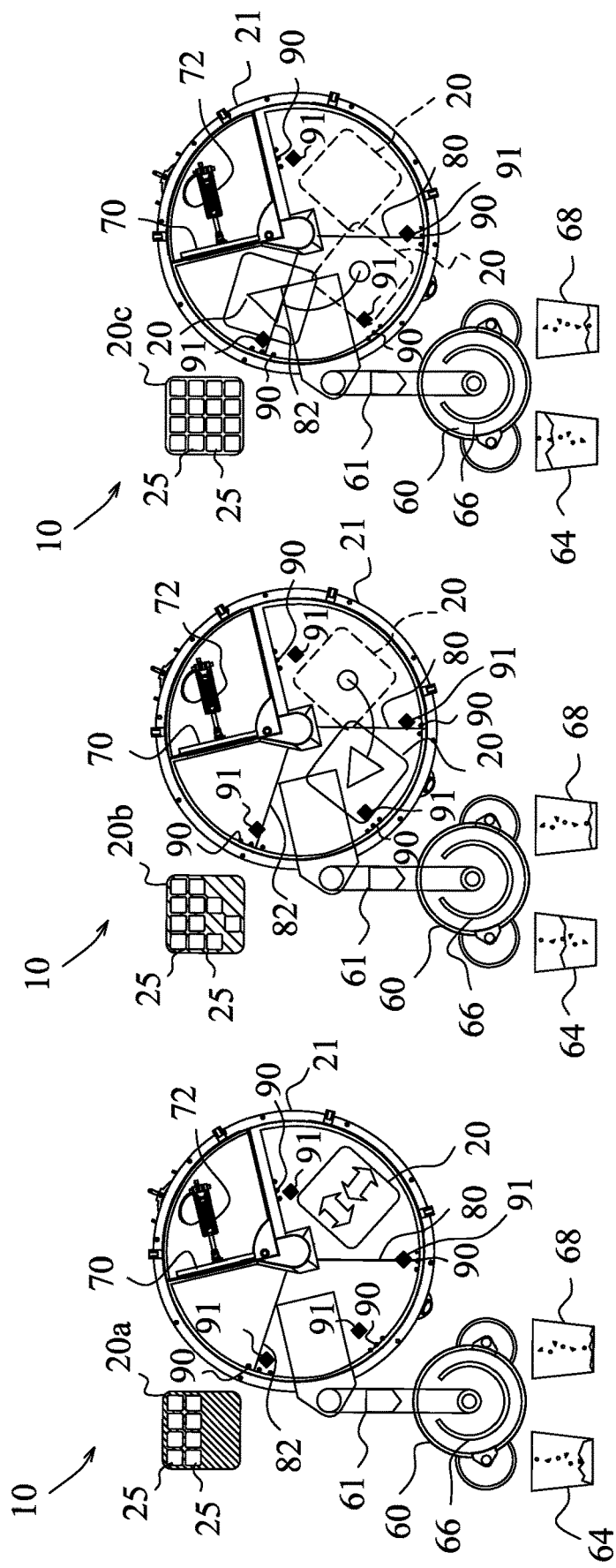

METHOD FOR THE TREATMENT OF CAKE RESULTING FROM ADDITIVE MANUFACTURING PROCESSES

CROSS-REFERENCE TO RELATED APPLICATIONS

This application is a 371 of PCT/IB2021/055398, filed Jun. 18, 2021, which claims the benefit of Italian Patent Application No. 102020000017350, filed Jul. 16, 2020.

FIELD OF THE INVENTION

The present invention relates to a method for treating cake resulting from additive manufacturing processes and a related machine suitably configured to implement the method according to the invention.

PRIOR ART

Italian patent application IT 10201900007052 discloses a surface mass finishing process comprising a fine particle feed phase within a vibratory finishing or tumbling machine having at least one toroidal volume process tank containing workpieces undergoing finishing processing.

The method further comprises a step of generating a rotary motion of said vibratory finishing or tumbling or vibro-blasting machine (vibroblast), wherein said rotary motion step is such as to create a fluid flow of the fine particles at least between the workpieces being processed and a step of evacuating the fine particles.

In particular, the feeding phase of fine particles belonging to blasting media into the above process tank takes place from the top downwards or tangentially to the circumference of the process tank.

Although this prior machine is perfectly capable of carrying out vibro-finishing or tumbling or vibro-sandblasting operations on various types of metal and plastic components having all types of origins (laser cutting, water cutting, casting, die-casting, micro-casting, sintered, extruded, sheared, cut-off, etc.), problems arise with improving the finishing processes in the case of particular applications in the Additive Manufacturing field, also known as 3D Printing.

Parts made using such innovative techniques can be manufactured using additive processes involving polymer or metal powders, often having high economic value.

Well-known techniques in the field of Additive Manufacturing include Selective Laser Sintering (SLS), which is perfect for functional testing, rapid prototyping and the like.

As is well known, Selective Laser Sintering (SLS) is a 3D printing process that uses laser radiation as an energy source to produce 3D objects in plastic—likewise Selective Metal Laser Sintering (SEM Selective Laser Melting or DMLS Direct Metal Laser Sintering) and related processes or their evolutions, which use powders and lasers with dynamics that provide for the final deconstruction and recovery of the powders, on the one hand, and of the dedusted parts, on the other. In the first phase of the manufacturing process, a thin layer of powder is distributed on the growth surface by means of a doctor blade, a combination of several blades or a roller. Layer thicknesses are comprised between 0.05 mm and 0.15 mm, depending on the resolution and equipment used.

Once the uniform application of the powder is complete, the production chamber is heated to a temperature just below the melting point of the respective plastic, which is then melted/sintered locally at the points required to make the component using a laser.

Finally, the construction or growth plan is lowered by the thickness of one layer and the process begins again.

The process is repeated until the printing of the last layer of the 3D model, or the nesting of 3D models, is completed.

However, during the execution of these processes SLS, SIM, DMLS, etc., a semi-finished product, also known as a "cake" is formed, which is essentially parallelepiped or cube-shaped, and which still contains residual dust that does not belong to the final part or parts and must be removed.

This gives rise to the well-known fact that many activities related to Additive Manufacturing post-processes constitute a serious bottleneck, i.e. a severe uneconomic slowdown of manufacturing processes.

An example of this is the widespread deconstruction stations or benches or booths, where an operator is assigned, who spends a lot of time performing manual operations, looking through a small window that is often dirty with dust, or wearing annoying personal protective equipment, to remove most of the dust from the cake in order to direct it to a circular vibrating screen housed under the work surface.

Then, all collected sintered components must be transferred to a sandblasting cabin, where any remaining dust and sintered droplets that remain attached or retained in some difficult areas are removed, one by one with hands in two rubber gloves, with one hand holding the component and the other the sandblasting gun.

Other solutions are equipped with a rotating basket made of perforated sheet metal, inside the sandblasting cabin, where the parts are mostly treated automatically, but this solution is not suitable for all types and shapes of components and can generate shocks in different situations.

US 2015/266211 discloses a system for post-print processing of 3D printed parts including an automated breakaway system for separating 3D printed parts from print media in a tray, and a vibratory media cleaning system for removing print media from 3D printed parts. The automated breaking system includes a tray input mechanism, a bed including a first end disposed adjacent to the tray input mechanism, the bed including one or more passages configured to pass print media through the bed, a vibration generator coupled to the bed and configured to vibrate the bed, and a part terminator disposed adjacent a second end of the bed. The vibratory cleaning system includes a vibrating container, a vibration generator coupled to the vibrating container and configured to vibrate the vibrating container, an automatic part loader configured to introduce 3D printed parts to be cleaned into the container, and an automatic part removal mechanism.

DE 102017002448 relates to a production line for processing a product comprising a component and loose powder adhered thereto and produced in an additive manufacturing process, with at least a first automated transport device for transporting the product between a manufacturing device and an unpacking station wherein the unpacking station includes at least one conveyor belt and at least one separation device, wherein the conveyor belt is suitable for transporting the product, and wherein the at least one separation device is suitable for vibrating the conveyor belt and/or striking the product on the conveyor belt with compressed air and/or particles to separate the loose powder from the component, and having at least a second automated transport device for transporting the component between the unpacking station and a storage station.

WO 2019138180A1 relates to a method for manufacturing a cosmetic product applicator comprising a gripper portion and an applicator portion having bristles or teeth. The method comprises a step S1 of additive manufacturing by sintering a powder of a plastic material followed by a depowdering step S2 and a post-treatment for removing particles that have detached from said cosmetic product applicator or are partially sintered, the post-treatment comprising the steps of: —sandblasting S4; and—ionizing blowing S5. This method allows the removal of particles susceptible to be irritating, for example, with a size greater than 500 micrometers, while being suitable for industrial production.

An aim of the present invention is therefore to reduce the production bottleneck generated by the manual operations that have to be carried out on small, medium or large growth plates or cakes produced by the machine and by the SLS, SIM, DMLS, etc. processes, all in order to be able to treat with vibrofinishing or tumbling or vibro-sandblasting (vibroblast), or optimally also components derived from Additive Manufacturing processes.

A further aim of the present invention is to achieve the above results in a practical and economical manner.

BRIEF SUMMARY OF THE INVENTION

The technical problems that can be summed up in the annoying bottleneck represented by manual or semi-automatic operations of doubtful effectiveness highlighted above, are solved by a method for the treatment of cake resulting from additive manufacturing processes, wherein the cake contains residual powders and sintered pieces and wherein said method comprises at least the steps of:
  destructuring of the cake in order to obtain separation of non-sintered powder from sintered pieces present in the cake;
  recovery of said powder deriving from said cake destructuring step, wherein said powder recovery step comprises separation of the powder according to its grain size; and
  automatic transfer of the sintered pieces to a vibratory finishing or tumbling or vibroblast machine, configured to finish the pieces, by removing residual impurities, making said pieces smooth and reduced in their surface roughness.

An advantage of this embodiment is that it is a complex yet complete and largely automatic process that entrusts a single machine with tasks previously carried out by one operator and a number of separate and independent machines, in several stages and times.

The invention also includes a machine for carrying out the phases of the method described, which is configured as a vibrofinishing or tumbling or vibro-sandblasting machine (vibroblast), the operational and functional advantages of which are now well known, wherein above said vibrofinishing or tumbling or vibro-sandblasting machine (vibroblast), there is a further component intended for destructuring the cake which, appropriately combined with a vibrating screen for recovering the powders, offers three processes in one:
  deconstruction of the cake, returning the sintered components ready for finishing;
  recovery of the non-sintered additive powder by vibro-separation (in some versions also with the aid of ultrasound);
  vibratory finishing or tumbling or vibro-blasting of the components, aimed at finishing them in order to provide adequate cleanliness, roughness, absence of residual dust or impurities nested in the most complex areas.

Claim 9 defines a machine of this inventive type, while further features of the invention can be inferred from the dependent claims.

BRIEF DESCRIPTION OF THE FIGURES

Further features and advantages of the invention will be apparent from reading the following description provided by way of non limitative example, with the aid of the figures illustrated in the appended tables, wherein:

FIGS. 3-5 show different method steps for de-structuring cake from additive manufacturing processes, according to an embodiment of the present invention.

DETAILED DESCRIPTION OF CERTAIN FORMS OF EMBODIMENT OF THE PRESENT INVENTION

Figure 1:
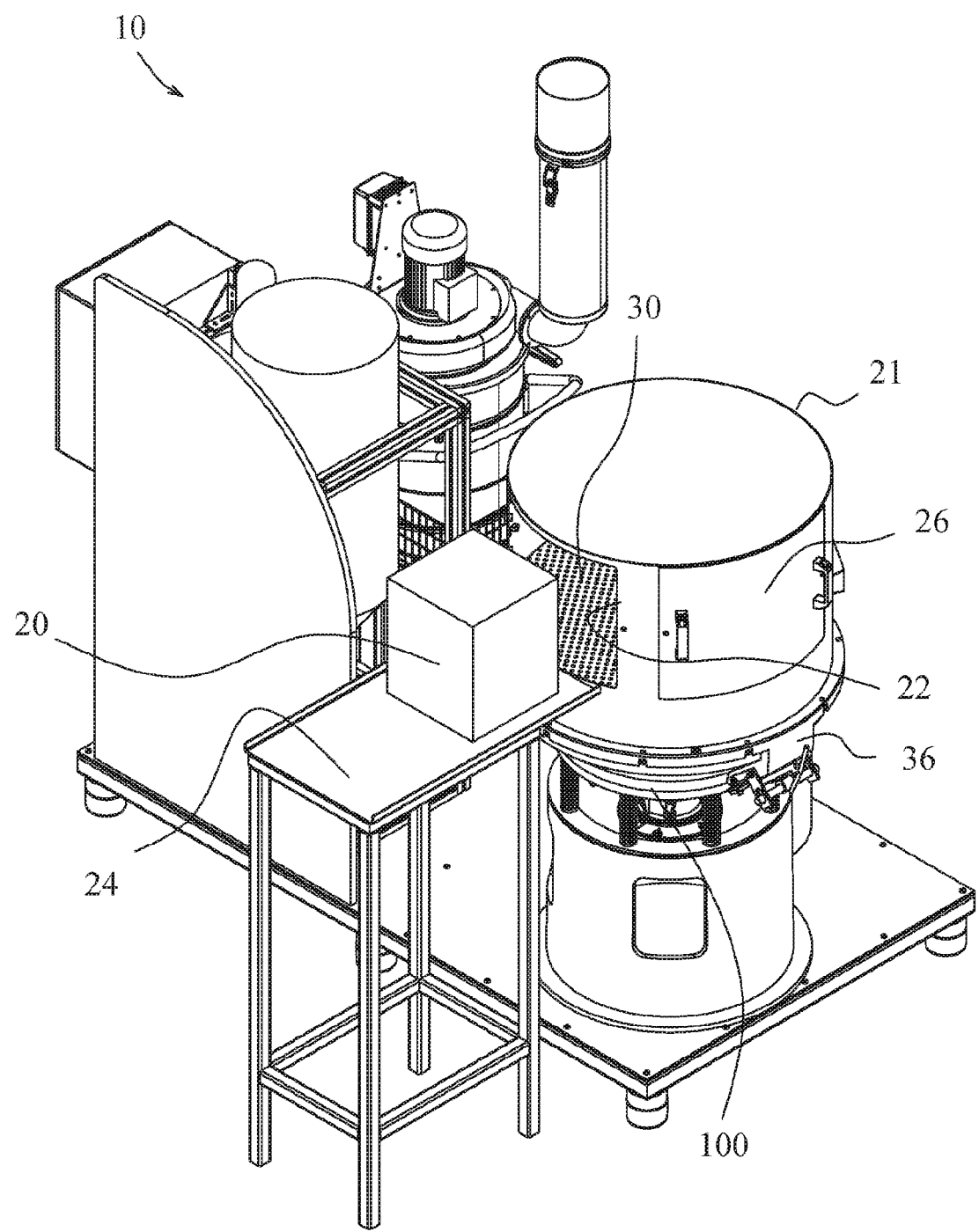
FIG. 1 shows an axonometric view of a machine for de-structuring cake from additive manufacturing processes, according to an embodiment of the invention.

With initial reference to FIG. 1, it shows a side view of a machine for de-structuring cakes resulting from additive manufacturing processes, according to an embodiment of the invention and globally indicated by numerical reference 10.

The machine 10 comprises a cylindrical body 21 equipped with a loading door 22 and an unloading door 26.

A feed table 24 or other means of feeding a cake 20 to be handled by the machine 10 may be placed at the loading door 22.

A grid 30 is also provided in the lower part of the cylindrical body 21. The cylindrical body 21 is in turn mounted on a vibratory finishing or vibro-blasting (vibroblast) machine 100, for example a machine of the type described in the cited Italian patent application IT 10201900007052.

Figure 2:
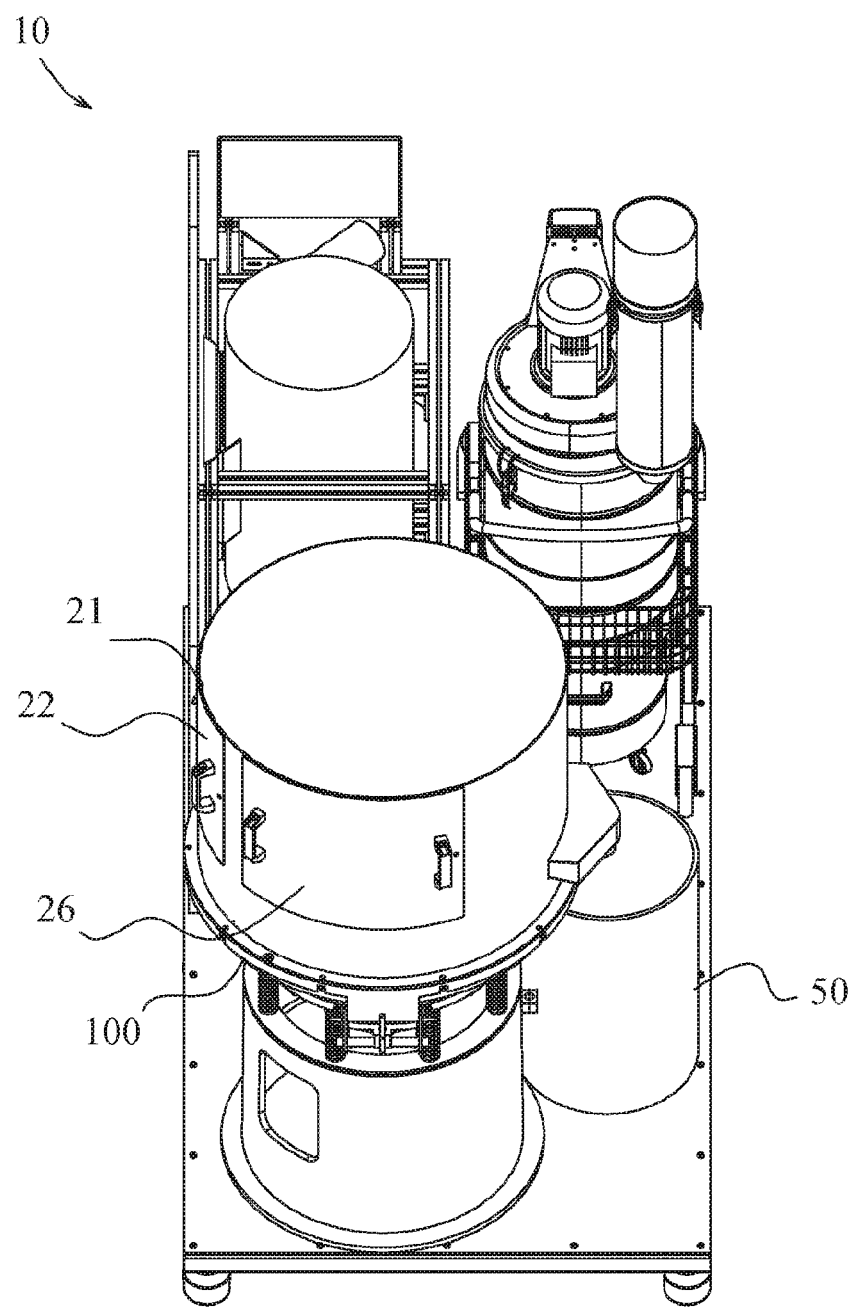
FIG. 2 shows a further axonometric view of the machine in FIG. 1.

The machine 10 also visible in FIG. 2 is also equipped with a circular vibrating screen for dust selection and recovery 50.

The cylindrical body 21 may be set in vibration by the same means that set the vibratory finishing machine 100 below said cylindrical body 21 in vibration.

The purpose of the machine 10 is to destructure the cakes 20 coming from particular additive manufacturing processes of the SLS, SIM, DMLS, etc. type, where the expression destructure means here to automatically separate the sintered pieces 25 (FIGS. 3, 4, and 5), obtained by additive manufacturing from the non-sintered powders that are in excess on said cake 20 (FIG. 1).

To destructure the cake 20 (FIG. 1), an operator need only place the cake 20 itself on the external platform or feeding table 24 designed to load the machine 10 ergonomically.

After the operator closes the loading door 22, all he has to do is select the recipe corresponding to the loaded item and press a cycle start button on a touch-screen control panel.

From now on, the machine 10 is programmed to perform all subsequent operations in fully automatic mode.

In particular, the de-structuring of cake 20 can be achieved automatically with the help of a method illustrated schematically in FIGS. 3-5.

FIG. 3 illustrates a first phase of the above method, in which the cake 20 has been schematically represented at the top left of said FIG. 3 with the numerical reference 20a, so as to indicate that the pieces 25 to be obtained from the cake 20 are still almost completely covered or enveloped in the powders.

As the process of the invention proceeds, the cake 20 is progressively deconstructed and the pieces 25 become progressively more prominent, as symbolically indicated in the succession of FIGS. 20a, 20b and 20c.

When the machine 10 is set to vibrate, the cake 20 tends to move in an anti-clockwise direction when viewed from above as shown in FIGS. 3, 4 and 5, and progressively encounters elastic 80 and 82 placed at different heights and/or with different configurations against which it is made to collide in such a way that the process of separating the powders of the cake 20 from the pieces 25 is progressively initiated.

In addition to this, groups of nozzles 90 are provided at several points to deliver compressed air against the cake 20, these nozzles being preferably arranged in groups of three.

The compressed air jets emitted by the various nozzle groups 90 and their time sequence can be adjusted via PLC, e.g. by stop-and-go sequences, i.e. periods when the jets are active, alternating with periods when the jets are not active.

The number of nozzle assemblies and their positioning within the cylindrical body 21 depends on the machine model and its capacity.

In some versions of machines, each group of nozzles 90 may be associated with an optional antistatic bulb 91 (or group of antistatic bulbs 91), capable of effectively attenuating the electrostatic charge inside the cylindrical body 21, so as to optimize cleaning between one material change and the next.

The destructuring phase or cycle depends on the machine model and can last for a predefined time T1, generally a few minutes, e.g. 2-3 minutes, or longer in the case of medium-large machines.

As soon as the growth plate or cake 20 is destructured by losing volume, size and part of the sintered components is gradually released, the decomposed mass proceeds, according to the programmed vibration, to the next areas in a counterclockwise direction in a short time, where for a certain period T2, other compressed air nozzles continue the dust removal action (FIG. 4).

When no more dust remains, a hatch 70 over which a pneumatic cylinder-piston unit 72 acts opens for transferring to the lower section of the workpieces 25, or for transferring to the lower section of the workpieces 25 to the vibratory finishing or vibratory blasting (vibroblast) machine 100 below.

In particular, it is noted that the vibratory finishing or vibro-blasting (vibroblast) machine 100 is separated from the machine 10 for de-structuring cakes from additive manufacturing processes of the invention, in order to avoid pollution of the dust to be recovered.

Therefore, as the vibratory finishing or vibratory sandblasting machine (vibroblast) 100 is completely separate from the cake de-structuring machine 10, it can operate with the required action on the workpieces 25.

In any case, even the drive of the vibratory finishing machine 100 and its timing and processing programs can be managed by executing recipes stored in the system software and, of course, everything can be managed on the basis of tailor-made programs that the operator can change whenever he wishes.

For example, the cycle can be short (10-15 minutes) if only a little residual dust attached to the parts needs to be removed, or they can continue to be finished without sanding, just with vibratory finishing media, for another 45 minutes, for example to sand and refine the surface finish as required.

The dust that falls from the cake 20 as a result of these destructuring processes on the one hand progressively releases the parts 25, and on the other hand said dust, falling through the grid 30, is conveyed through a pipe 61 into a vibrating screen 60.

In turn, vibrating screen 60 is configured to separate the powder and obtain a first type which is collected in bucket 64. This is a powder of materials such as polyamide or nylon that can be subsequently recovered.

The recovered powders can be mixed with new powders at a later stage, i.e. with powders that have never been subjected to laser sintering processes to recover a part of the material, up to half of the total quantity, so as to reduce the overall costs of the products obtained by SLS, SIM, EVILS etc.

Finally, larger components are recovered in the bucket 68, e.g. in the form of granules, abnormally agglomerated dust clusters and the like, which were left on the grid 30 because they were too large to fall through.

In some embodiments, the separation table or screen mesh of the vibrating screen 60 can be assisted by ultrasound 66 which makes the process very efficient and reduces maintenance and screen cleaning intervals almost to zero.

In embodiments where antistatic bulbs 91 were already present, in synergy with ultrasound 66, a very high level of efficiency in the recovery of polymeric additive powders would be achieved.

Obviously, modifications or improvements may be made to the invention as described, dictated by contingent or particular motives, without going beyond the scope of the invention as claimed below.

The invention claimed is:

1. A machine for treating cakes resulting from additive manufacturing processes, wherein said cake contains residual powders and sintered pieces, said machine comprising:
   a cylindrical vibrating body placed in a superior position with respect to a vibratory finishing, tumbling, or vibro-blasting machine,
   wherein said cylindrical vibrating body is separated from the vibratory finishing, tumbling, or vibro-blasting machine by a remotely operable hatch and wherein said cylindrical vibrating body is configured to vibrate as a consequence of the vibration of the vibratory finishing, tumbling, or vibro-blasting machine below,
   wherein said machine includes means for destructuring the cake in order to obtain separation of the unsintered powder from the sintered pieces present in the cake and means for recovering the powder resulting from the destructuring of the cake.

2. A method of treating cake using a machine of claim 1, wherein a cake destructuring step is provided to separate the unsintered powder from the sintered pieces present in the cake, which takes place within the vibrating cylindrical body.

3. The method of claim 2, wherein the step of destructuring the cake occurs by interference of the cake with elastic elements placed at different heights or with different configurations within said vibrating cylindrical body against which said cake is made to collide in such a way that the process of separating the powders of the cake from the pieces is progressively carried out.

4. The method of claim 3, wherein the cake destructuring step is performed by means of groups of nozzles, placed inside said cylindrical vibrating body, said nozzles being configured to inject compressed air against the cake, wherein the jets of compressed air emitted by the groups of nozzles and their activation is adjustable to provide for periods in which the jets are active, alternating with periods in which the jets are not active.

5. The method of claim 4, wherein each group of nozzles is associated with at least one antistatic bulb capable of effectively attenuating the electrostatic charge inside the cylindrical body, to provide cleaning between one change of the treated material and the next.

6. The method of claim 2, further comprising a step of recovering the powder resulting from the cake destructuring step, said step of recovering being performed by means of a vibrating screen, equipped with a separation plane, and configured to separate the powder thereby obtaining a powder of materials to be subsequently recovered and mixed with powders that have not undergone sintering treatments.

7. The method of claim 2, wherein an action of a vibrating screen separation table is assisted by an ultrasonic generator.

8. The method of claim 2, further comprising a step of automatically transferring the sintered pieces to the vibratory finishing, tumbling, or vibro-blasting machine, said step of automatically transferring being performed by means of a pneumatic cylinder-piston assembly which opens a hatch on which said pneumatic cylinder-piston assembly acts to transfer the powder separated sintered pieces to a lower section.

* * * * *